US006846156B2

(12) United States Patent
Magoshi

(10) Patent No.: US 6,846,156 B2
(45) Date of Patent: Jan. 25, 2005

(54) GAS TURBINE

(75) Inventor: Ryotaro Magoshi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/433,610

(22) PCT Filed: Jun. 4, 2002

(86) PCT No.: PCT/JP02/05470
§ 371 (c)(1),
(2), (4) Date: Jun. 17, 2003

(87) PCT Pub. No.: WO02/099253
PCT Pub. Date: Dec. 12, 2002

(65) Prior Publication Data
US 2004/0022622 A1 Feb. 5, 2004

(30) Foreign Application Priority Data

Jun. 4, 2001 (JP) ........................................ 2001-168416

(51) Int. Cl.[7] ................................................ F01D 11/24
(52) U.S. Cl. ........................ 415/114; 415/115; 415/116; 415/173.2; 415/173.3; 415/175; 415/176; 415/178
(58) Field of Search ...................... 415/114–116, 173.1, 415/173.2, 173.3, 175, 176, 177, 178

(56) References Cited

U.S. PATENT DOCUMENTS 4,859,142 A * 8/1989 Burke et al. ................. 415/116
6,146,091 A   11/2000 Watanabe et al.
6,463,729 B2 * 10/2002 Magoshi et al. ............. 415/178
6,508,623 B1 * 1/2003 Shiozaki et al. ........... 415/173.1
6,602,048 B2 * 8/2003 Fujikawa et al. ............ 415/116

FOREIGN PATENT DOCUMENTS

| JP | 62-150502 U | * | 9/1987 |
| JP | 11-159345   |   | 6/1999 |
| JP | 2001-289059 |   | 10/2001 |

* cited by examiner

Primary Examiner—Christopher Verdier
(74) Attorney, Agent, or Firm—Oblon, Spivak, McClelland, Maier & Neustadt, P.C.

(57) ABSTRACT

In a gas turbine, blade ring cooling passages are provided inside a first blade ring and a second blade ring. The blade ring cooling passages are connected with each other through a communication pipe that is arranged in an axial direction of the blade ring. From outside of a wheel chamber, cooling air to cool down stationary blades is sent with pressure into an inside of the stationary blades that are installed on an inner wall of the blade rings. Thermal shields are provided on outer surfaces of the blade rings and communication pipes through gaps therebetween. In the gaps between the outer surfaces of the blade rings or the outer surfaces of the communication pipes and the thermal shields, partitions are installed to stagnate the cooling air to cool down the stationary blades.

10 Claims, 5 Drawing Sheets

GAS TURBINE

TECHNICAL FIELD

The present invention relates to a gas turbine and more particularly to gas turbine blade rings having blade ring cooling passages to improve effects of thermal shields provided around the blade rings.

BACKGROUND ART

FIG. 5 is a cross section of an inside of the gas turbine. The gas turbine is used for the convenience of explanation of the present invention, and does not belong to the category so-called known art. In FIG. 5, a first blade ring 31 and a second blade ring 32 are separated. The first blade ring 31 and the second blade ring 32 correspond to a first moving blade 33 and a second moving blade 34, respectively. Circumferential blade ring cooling passages 35 and 36 are provided inside the first blade ring 31 and the second blade ring 32 respectively. The cooling passages 35 and 36 are axially connected with each other through a communication pipe 37.

From the outside of the blade rings 31 and 32 (herein, the outside of a wheel chamber 38) cooling air 39 to cool down stationary blades is forcefully introduced. The cooling air 39 flows through a space made by an inner wall of the wheel chamber 38 and outer surfaces of the blade rings 31 and 32, and eventually flows into the inside of a stationary blade 40, then is exhausted from small holes 41 provided on the surface of the stationary blades.

Temperature and pressure-controlled steam flows inside the cooling passages 35 and 36. Thereby, the steam optimally maintains clearance between the first moving blade 33 and an inner wall 42 of the first blade ring that opposes the blade 33, and also the clearance between the second moving blade 34 and an inner wall 43 of the second blade ring that opposes the blade 34, while the turbine is running. Meanwhile, if the cooling air 39 hits outer surfaces of the blade rings 31, 32, and the communication pipe 37, due to an effect of heat transfer, the cooling air 39 affects the temperature of the steam flowing inside the cooling passages 35 and 36, because the temperature of the cooling air 39 is different from the temperature of the steam. Thermal shields 44 are provided on the outer surfaces of the blade rings 31, 32, and the communication pipe 37, to avoid direct contact of the cooling air 39 with the outer surfaces of the blade rings 31, 32, and the communication pipe 37.

It is not appropriate to attach the thermal shields 44 directly to the blade rings 31 and 32, because the thermal shields 44 are made of metal plates, and have a different thermal expansion coefficient from a thermal expansion coefficient of the blade rings 31 and 32 at the same temperature. Thus, the thermal shields 44 are bolted to the outer surfaces of the blade rings 31 and 32 through spacers. By this means, gaps are produced between the outer surfaces of the blade rings 31 and 32 and the thermal shields 44. According to the art, a thermal shield effectiveness of the thermal shields 44, and the air existing in the gaps, enhanced the effects of the thermal shields.

However, according to the art, there are slight gaps between the outer surfaces of the blade rings and the thermal shields. Therefore, by forced convection (especially, by dynamic pressure) of the cooling air which is high-speed and high-pressure, the air with a different temperature from the steam temperature, easily and problematically enters into the gaps. If the high-speed air enters into the gaps, a heat transfer coefficient of the outer surface of the blade rings and the like fluctuates, thereby the effect of the thermal shields reduces by half.

Therefore, it is an object of the present invention to provide a gas turbine that effectively controls a loss of heat in the blade ring cooling passages by adding a contrivance to the gaps between the outer surfaces of the blade rings and thermal shields.

DISCLOSURE OF THE INVENTION

The gas turbine according to the next invention comprises a plurality of blade rings arranged along an axis of the gas turbine; a moving blade which rotates along an inside of each of the blade rings; a stationary blade mounted to an inner wall of each of the blade rings; a plurality of steam passages, provided in each of the blade rings at a periphery of a corresponding moving blade, for flowing temperature-controlled steam for cooling the corresponding moving blade; an air passage for taking in cooling air from outside and cooling the stationary blades; a communication pipe for connecting two steam passages so that steam from one steam passage flows into another steam passage; a plurality of thermal shields provided to the blade ring and the communication pipe between the steam passage and the air passage so that the steam flowing in the steam passage and the communication pipe is thermally shielded from the cooling air flowing in the air passage, wherein the thermal shields are attached to a surface of the blade ring and a surface of the communication pipe with a gap therebetween in such a manner that the cooling air flows in the gap; and a plurality of partitions formed in the gap and on the surface of the blade ring and the communication pipe to stagnate the cooling air.

The cooling air is to cool down the stationary blade, which is exposed to high-temperature and high-pressure in the turbine. Therefore, the cooling air is supplied in a form of high-speed and high-pressure, from the outer sides of the blade rings. The cooling air contains a lot of dynamic pressure elements, and easily penetrates into the gaps, resulting in a fluctuation of a heat transfer coefficient of the outer surfaces of the blade rings. According to the present invention, fluctuation of the heat transfer coefficient is prevented from occurring by installing partitions in the gaps. The partitions are made by bending edges of the thermal shields, or installing convex structures which stick out on the outer surfaces of the blade rings, or installing sticking out attachments on backsides of the thermal shields.

The gas turbine according to the next invention comprises a plurality of blade rings arranged along an axis of the gas turbine; a moving blade which rotates along inside of each of the blade rings; a stationary blade mounted to an inner wall of each of the blade rings; a plurality of steam passages, provided in each of the blade rings at a periphery of a corresponding moving blade, for flowing temperature-controlled steam for cooling the corresponding moving blade; an air passage for taking in cooling air from outside and cooling the stationary blades; a communication pipe for connecting two steam passages so that steam from one steam passage flows into another steam passage; a plurality of thermal shields provided to the blade ring and the communication pipe between the steam passage and the air passage so that the steam flowing in the steam passage and the communication pipe is thermally shielded from the cooling air flowing in the air passage, wherein the thermal shields are attached to a surface of the blade ring and a surface of the communication pipe with a gap therebetween in such a manner that the cooling air flows in the gap; and a plurality of partitions formed in the gap and on the surface of the blade ring and the communication pipe to stagnate the cooling air.

When there are the plural blade rings and each of the blade rings has its cooling passage, the cooling passages are axially connected with the communication pipes. Thus, the temperature-controlled steam flows into the communication pipes. Therefore, the thermal shields are also provided around the communication pipes so that the cooling air does not directly hit the pipes. According to the present invention, partitions are provided in gaps between outer surfaces of the communication pipes and the thermal shields to stagnate the cooling air. Thereby, the partitions prevent the cooling air having a high dynamic pressure, from entering into the gaps. Stagnation of the cooling air prevents fluctuation of the heat transfer coefficient from occurring, and improves controllability of the steam which flows through the blade ring passages. The partitions are made by bending edges of the thermal shields, or installing sticking out attachments to the outer surface of the blade rings, or installing sticking out attachments to backsides of the thermal shields.

In the gas turbine according to the next invention based on the above-mentioned invention, the blade ring is cylindrical; and the partitions stick outwards from the surface of the blade ring along a radial direction of the blade, parallel to an axis of the blade ring, and are arranged sporadically on a circumference of the blade ring in such a manner that the cooling air that flows along the circumference of the blade ring is stagnant.

The blade ring and the communication pipe have cylindrical structures, and are located on the outer circumference of the gas turbine within a wheel chamber. Hereby, a forced convection, generated by an inflow of the high-speed and high-pressure cooling air tends to have a circumferential directionality. Furthermore, if a temperature difference occurs, a natural convection caused by the temperature difference also tends to have the circumferential directionality.

In the present invention, the partitions have convex structures, and stick out toward radial directions from the outer surfaces of the blade rings and communication pipes which are cylindrical in shape. The partitions are installed circumferentially and sporadically, and fill up the gaps between the outer surfaces of the blade rings or communication pipes and the thermal shields. Thus, the partitions are capable of stagnating the cooling air that flows circumferentially.

In the gas turbine according to the next invention based on the above-mentioned invention, the blade ring is cylindrical; and the partitions stick outwards from the surface of the blade ring along a radial direction of blade ring, perpendicular to an axis of the blade ring, and arranged continuously on a circumference of the blade ring in such a manner that the cooling air that flows along the axis of the blade ring is stagnant.

In the present invention, partitions have convex structures that stick out to the radial direction of the outer surfaces of the cylindrical blade rings and the communication pipes. As described above, the forced convection, generated by the cooling air, tends to have directionality along circumferential directions of each structure. However, the cooling air involves high-speed turbulent elements. If continuous partitions are installed circumferentially in the gaps between the outer surfaces of the blade rings or communication pipes and the thermal shields, speed elements of the cooling air reduce. Thus, partitions prevent the cooling air from penetrating, due to dynamic pressure, into the gaps.

In the gas turbine according to the next invention based on the above-mentioned invention, the blade ring is cylindrical; and the partitions stick outwards from the surface of the blade ring along a radial direction of blade ring and are arranged in desired directions with respect to an axis of the blade ring on in such a manner that the cooling air that flows along any directions is stagnant.

In the present invention, the partitions have convex structures that stick out into the radial directions of the outer surfaces of the cylindrical blade rings and communication pipes. Therefore, by installing a plurality of partitions in different directions, it is possible to stagnate the stationary blade cooling air that flows into the radial directions and the circumferential directions in the outer surfaces of the blade rings and communication pipes. Further, the directions of the partitions do not necessarily have to be in parallel with the axial directions or circumferential directions. The partitions may be installed at an angle to the axial directions.

The gas turbine according to the next invention based on the above-mentioned invention, the thermal shields are supported by the partitions.

In the convex structures in which the partitions stick out from the outer surfaces of the blade rings and communication pipes, the supporting legs which stick out from the thermal shield toward opposing blade rings can exert the same effects as the partitions. Therefore, the cooling air that penetrates into the gaps can be stagnated by installing the supporting legs in circumferential directions sporadically, continuously, or in different directions in a plurality.

BEST MODE FOR CARRYING OUT THE INVENTION

The invention will be explained in detail with reference to the accompanying drawings. However, the invention is not limited to that explained in the embodiment.

Figure 1:
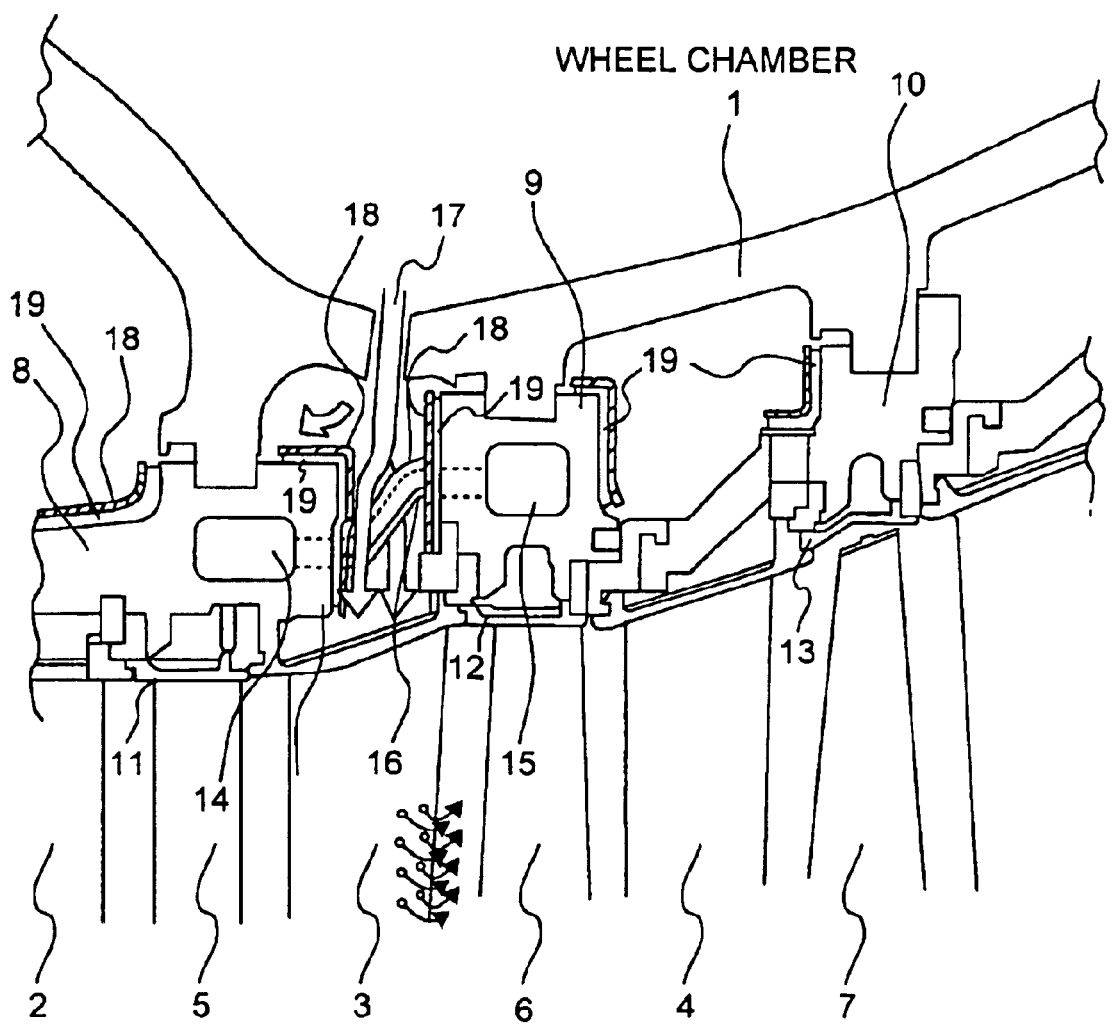
FIG. 1 shows a cross section of an inside of a gas turbine according to an embodiment of the present invention.

First Embodiment:

FIG. 1 is a cross section of an inside of a gas turbine according to the first embodiment of the present invention. In a wheel chamber 1 of the gas turbine, stationary blades 2, 3, and 4 and moving blades 5, 6, and 7 are arranged in several stages. Cylindrically-shaped blade rings 8, 9, and 10 are fitted in the wheel chamber, and hold stationary blades 2, 3, 4 and possess opposing portions 11, 12, and 13. The blade rings 8, 9, and 10 are assembled in connection with each other in an axial direction.

Blade ring cooling passages 14 and 15 are provided in each of the first blade ring 8, and second blade ring 9 to allow temperature-controlled steam to flow in the cooling passages. The cooling passages 14 and 15 are connected with each other by communication pipes 16 in axial directions. In general, the communication pipes 16 are provided around the blade rings 8 and 9 in circumferential directions in a plurality. From the outside of the wheel chamber 1, the cooling air 17, which cools down the stationary blades, is taken in and forcefully sent into the inside of the stationary blades. The cooling air 17 is not necessarily taken in from the outside of the wheel chamber, but may also be sent from a compressor of the gas turbine to the outside of the blade rings via the inside of the wheel chamber.

The steam flowing through the cooling passages 14 and 15 is temperature-controlled to optimally maintain the clearance between the peripheries of the moving blades 5, 6 and the portion 11 and 12, which oppose the peripheries of the moving blades, while the turbine is running. On the other hand, the cooling air 17 is to cool down the stationary blades which are exposed to high-temperature and high-pressure atmosphere in the turbine. The temperature of the cooling air is irrespectively different from the temperature of the steam. As shown in FIG. 1, the stationary blades cooling air 17 is sent to the inside of the stationary blade 3 through the space where blade rings 8, 9 and the communication pipes 16 are mounted in the wheel chamber 1. Therefore, if the cooling air 17 hits the blade rings 8, 9 or communication pipe 16, the air turns into a disturbance and adversely affects the temperature-control of the steam. Therefore, the thermal shields 18 are mounted through gaps to the outer surfaces of the blade rings 8, 9 and communication pipes 16.

The partitions 19 are provided in the gaps between the outer surfaces of the blade rings 8, 9 and communication pipes 16 to stagnate the cooling air. The partitions 19 prevent the cooling air 17 flowing into the turbine at a high-speed and having a high dynamic pressure, from penetrating into the gaps. If the cooling air is stagnated, fluctuation of the heat transfer coefficient is prevented from occurring to improve controllability of the temperature of the steam which flows in the blade ring cooling passages.

Figure 2:
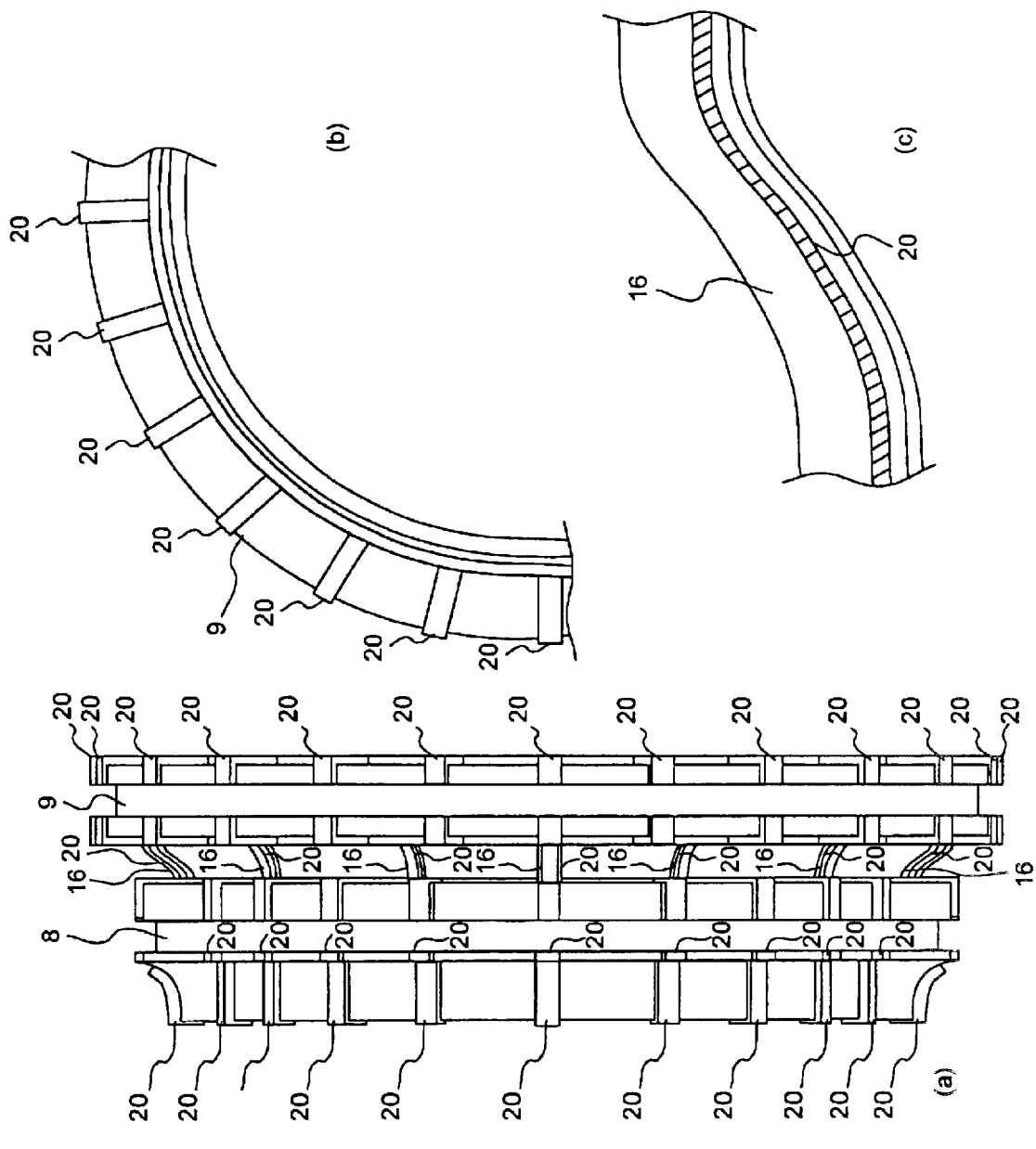
FIG. 2 shows an external appearance of the partitions installed on the outer surfaces of the blade rings and the communication pipes, (a) is a side view, (b) is a front view, (c) is an enlarged view of the communication pipe in (a)

FIG. 2 shows an external appearance of the partitions installed on the outer surfaces of the blade rings and the communication pipes. In FIG. 2, (a) is a side view, (b) is a front view, (c) is an enlarged view of the communication pipe in (a). FIG. 2 shows a state that thermal shields are removed for the sake of explanation. The partitions 20 stick out to the radial directions of the blade rings 8, and 9, and communication pipes 16 on which the partitions 20 are installed. Further, the partitions 20 are installed sporadically in the circumferential directions of the blade rings 8, 9, and communication pipes 16.

Numbers of the partitions are not limited to the numbers shown in FIG. 2. The numbers are properly chosen depending on the dynamic pressure of the cooling air and the place where the cooling air is taken in. In FIG. 2, the partitions are installed almost in the axial directions, but the directions are not limited to the axial directions. The partitions may be installed at an angle to the axial directions. Further, if the thermal shields are bolted on the top of the convex-structured partitions, attaching the thermal shields becomes convenient. Furthermore, the convex-structured partitions 20 may be installed as attachment legs of the thermal shields.

The forced convection, generated by inflow of the high-speed and high-pressure stationary blade cooling air from the outside of the blade rings, tends to have a circumferential directionality with respect to each construction. Furthermore, if a temperature difference occurs, a natural convection caused by the temperature difference also tends to have the circumferential directionality. The partitions 20 fill in the gaps between the outer surfaces of the blade rings or communication pipes and the thermal shields, and are able to stagnate the circumferential flow of the cooling air.

As explained above, according to the gas turbine of the embodiment, the convex structures are built in circumferential directions sporadically, in the gaps between the outer surfaces of the blade rings or communication pipes. Hereby, it is possible to stagnate the air that exists in the gaps between the outer surfaces of the blade rings and the thermal shields. Thus, it is possible to reduce the disturbance generated by the contact of the cooling air with the blade ring passages in which temperature-controlled steam flows.

According to the gas turbine the heat loss at the blade ring cooling passages becomes substantially controllable, which is impossible by the thermal shields alone. If the temperature control of the steam is performed properly, without the disturbance of the cooling air, the clearance between the moving blades and the opposing blade rings are maintained optimally, thus, the turbine efficiencies improve.

Figure 3:
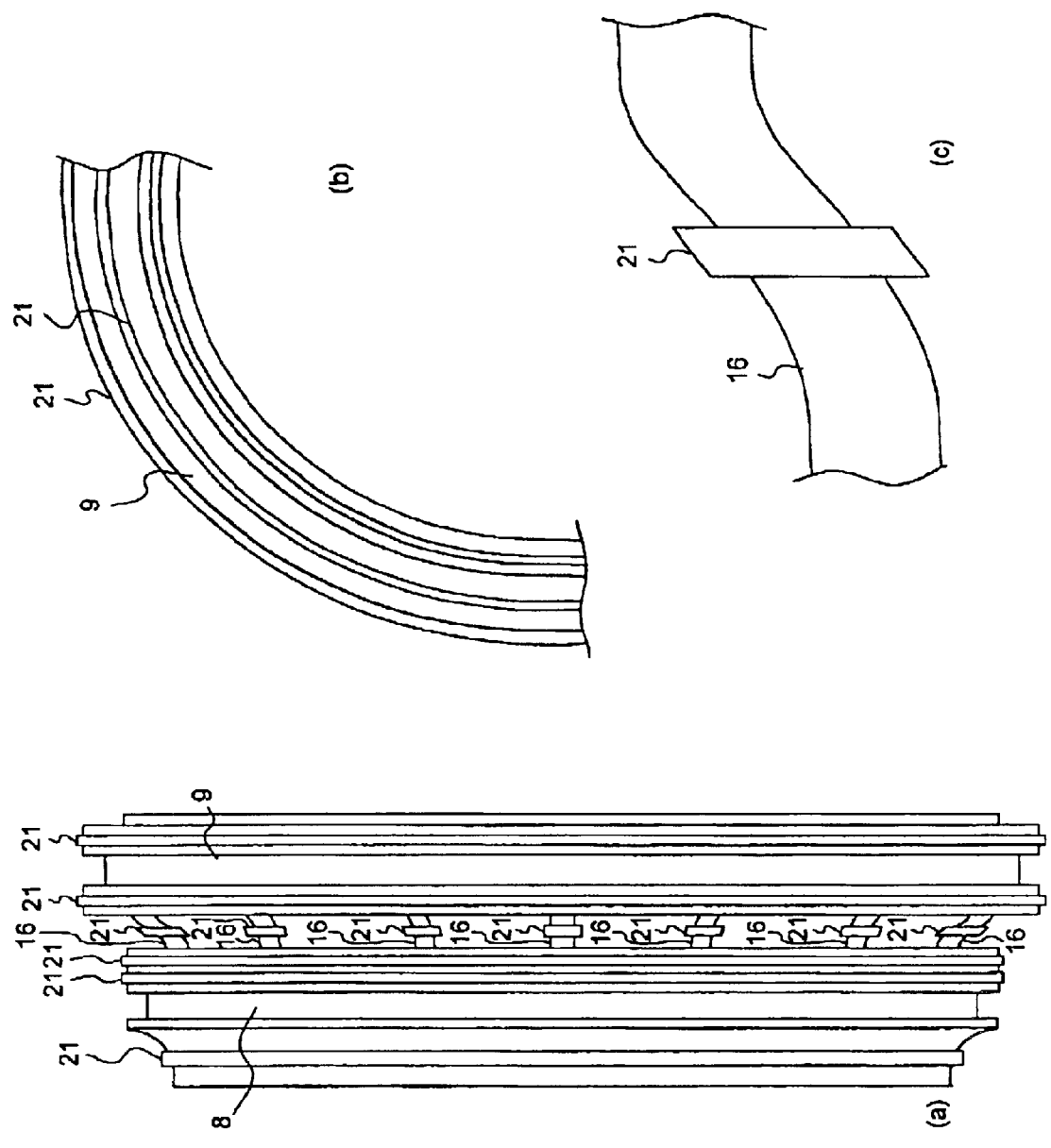
FIG. 3 shows an example of an external appearance of a modified form of the partitions, (a) is a side view, (b) is a front view, (c) is an enlarged view of the communication pipe in (a)

First Modification:

FIG. 3 shows an example of a modification of an external appearance of the partitions installed on the outer surfaces of the blade rings and communication pipes. In the FIG. 3, (a) is a side view, (b) is a front view, (c) is an enlarged view of the communication pipe in (a). FIG. 3 shows a state that thermal shields are removed just the same as FIG. 2. In the first modification, partitions 21 stick out to the radial directions of the blade rings 8, and 9, and the communication pipes 16 on which the partitions 21 are installed, just the same as the first embodiment.

According to the first modification, the partitions 21 are continuously installed on the blade rings 8, 9 and the communication pipes 16 in the circumferential directions. Numbers of the partitions are not limited to the numbers shown in FIG. 3. The numbers are properly chosen depending on the dynamic pressure of the stationary blades cooling air and the place where the cooling air is taken in. In FIG. 3, the partitions are installed in the circumferential directions, but the directions are not limited to the circumferential directions. The partitions may be installed at an angle to the circumferential directions. Further, if the thermal shields are bolted on the top of the convex-structured partitions, attaching the thermal shields becomes convenient. Furthermore, the convex-structured partitions 21 may be installed as attachment legs of the thermal shields.

The forced convection, generated by the cooling air of the stationary blades, tends to have the directionality in the circumferential directions of the blade rings 8, 9 and the communication pipes 16. However, the cooling air involves the high-speed turbulent elements. If the continuous partitions are provided in the gaps between the outer surfaces of the blade rings 8, 9 and communication pipes 16, the speed element of the cooling air reduces, thus, it is possible to prevent the cooling air from penetrating into the gaps, which may otherwise occur due to the dynamic pressure of the cooling air.

As explained above according to the first modification, the gas turbine is provided with the continuous convex-structured partitions in the gaps between the outer surfaces of the blade rings or the outer surfaces of the communication pipes and the thermal shields, it is possible to stagnate the air existing in the gaps. Thereby, the effects of the stationary blades cooling air against the blade ring cooling passages in which the temperature-controlled steam flows can be reduced.

According to the gas turbine, the heat loss at the blade ring cooling passages becomes substantially controllable, which is not possible by the thermal shields alone. If the temperature control of the steam is performed properly, without the disturbance of the cooling air, the clearance between the moving blades and the opposing blade rings are maintained optimally, thus, the turbine efficiencies improve.

Figure 4:
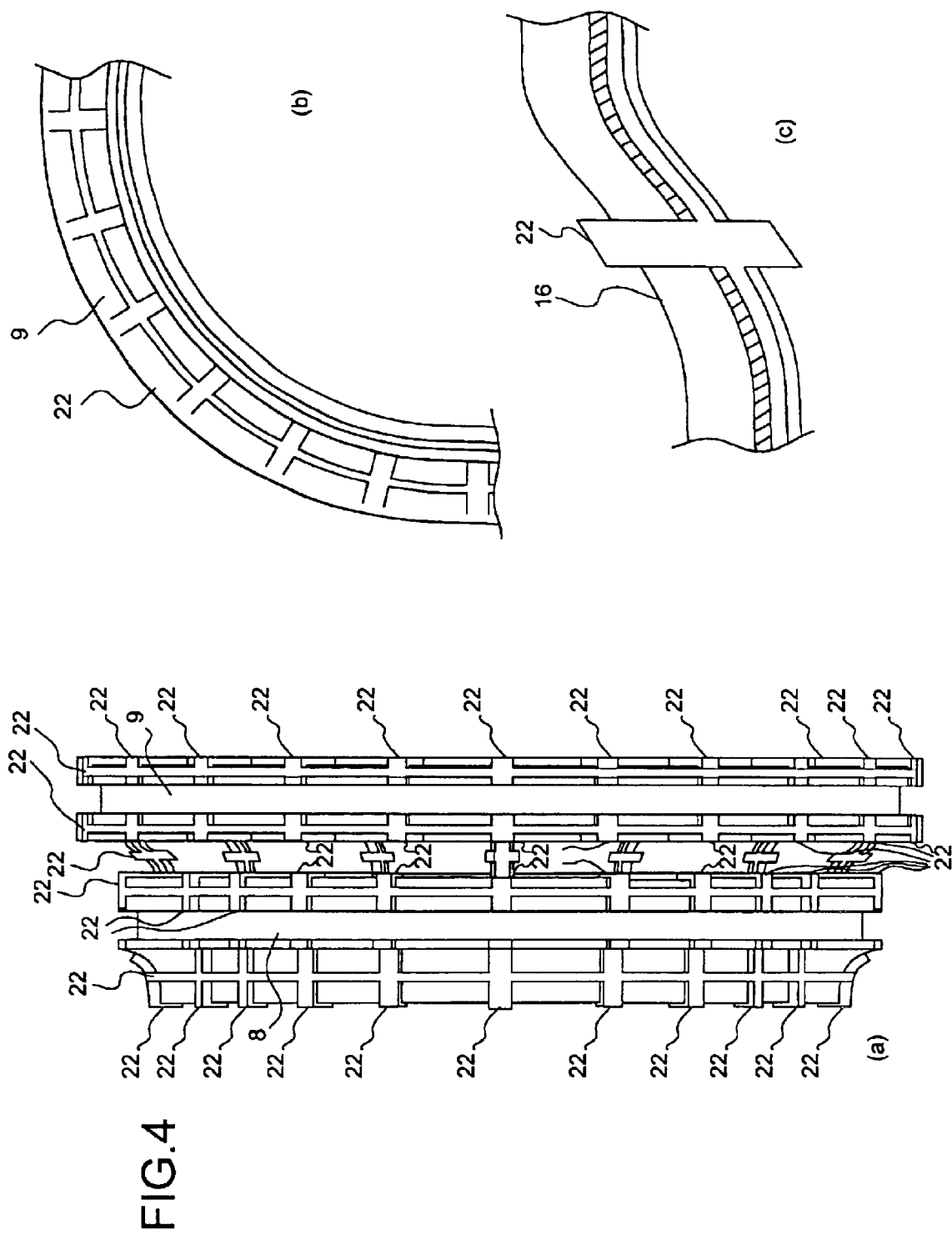
FIG. 4 shows another example of an external appearance of a modification form of the partitions, (a) is a side view, (b) is a front view, (c) is an enlarged view of the communication pipe in (a)
Figure 5:
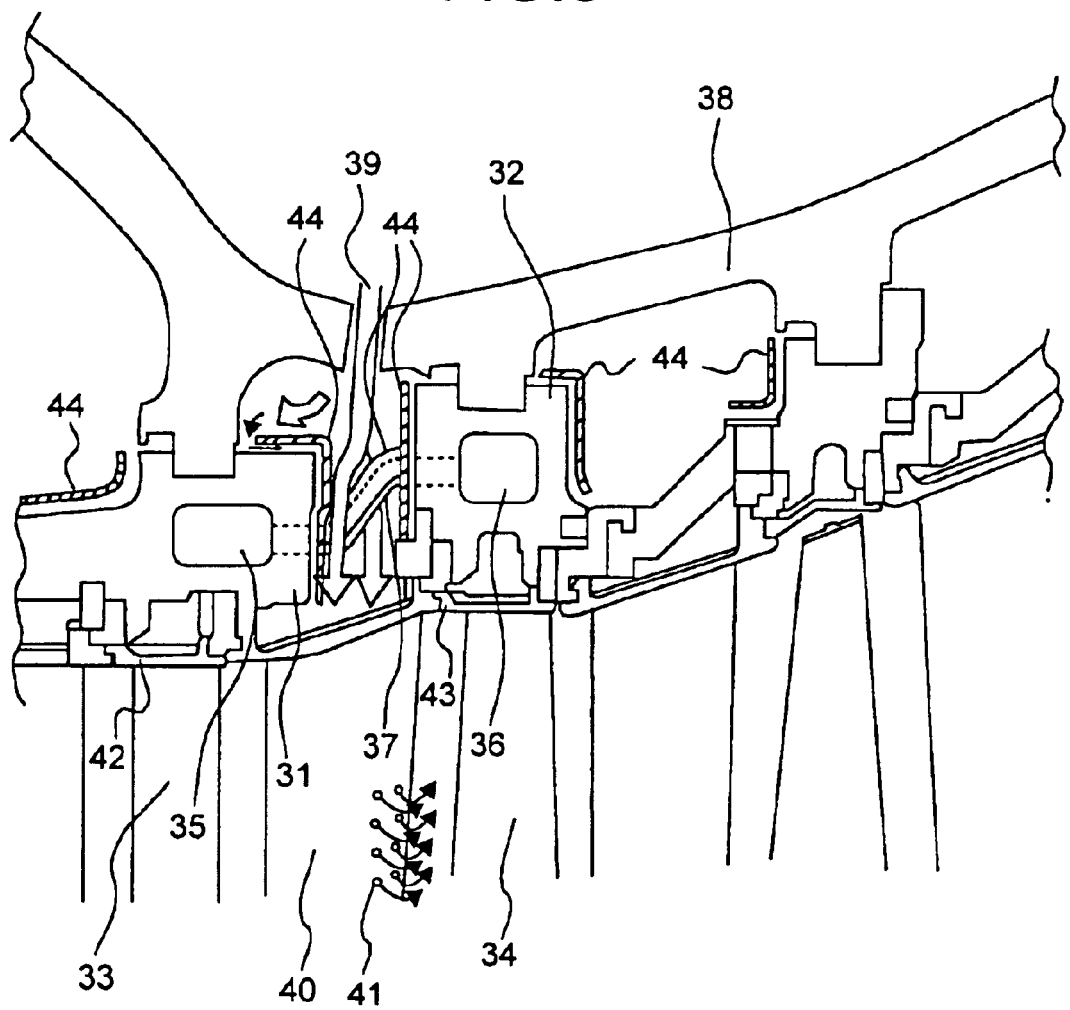
FIG. 5 shows a cross section of an inside of the gas turbine.

Second Modification:

FIG. 4 shows an example of a second modification of an external appearance of the partitions installed on the outer surfaces of the blade rings and communication pipes. In the FIG. 4, (a) is a side view, (b) is a front view, (c) is an enlarged view of the communication pipe in (a). FIG. 4 shows a state that thermal shields are removed just the same as FIG. 2 and FIG. 3. In the second modification also, partitions 22 stick out to the radial directions of the blade rings 8, 9, and the communication pipes 16 on which the partitions are installed, and the partitions are the convex-structured just the same as the embodiment of the first modification.

Further, the partitions 22 are installed in different directions in a plurality, and stagnate the air existing in the gaps between the outer surfaces of the blade rings 8, 9, or the outer surfaces of the communication pipes 16, and the thermal shields. In FIG. 4, the partitions 22 are installed in two directions, that is, in the axial directions and in the circumferential directions, and the partitions installed in two different directions are united. However, as far as the air can be stagnated, there is no need to unite the two different directions of partitions 22. Furthermore, the partitions should not necessarily be installed in the axial direction or the circumferential direction. The partitions may be installed at an angle to the axial direction or the circumferential direction. Further, if the thermal shields are bolted on the top of the convex-structured partitions 22, attaching of the thermal shields becomes convenient. Furthermore, the convex-structured partitions 22 may be installed as attachment legs of the thermal shields.

According to the second modification, the gas turbine is provided with the convex-structured partitions in the gaps between the outer surfaces of the blade rings or outer surfaces of the communication pipes and the thermal shields, it is possible to stagnate the air existing in the gaps. Thereby, the effects of the stationary blade cooling air against the bade ring cooling passages in which the temperature-controlled steam flows can be reduced.

According to the gas turbine, the heat loss at the blade ring cooling passages becomes substantially controllable, which is not possible by the thermal shields alone. If the temperature control of the steam is performed properly, without the disturbance of the cooling air, the clearance between the moving blades and the opposing blade rings are maintained optimally, thus, the turbine efficiencies improve.

As explained above, according to the gas turbine of the present invention, the partitions for stagnating the stationary blade cooling air are provided in the gaps between the outer surfaces of the blade rings and the thermal shields. Therefore, it is possible to reduce the disturbance generated by the contact of the cooling air with the blade ring cooling passages in which the temperature-controlled air flows. Thereby, the heat loss at the blade ring cooling passages becomes substantially controllable, which is impossible by the thermal shields alone. If the temperature control of the steam is performed properly, without the disturbance of the cooling air, the clearance between the moving blades and the opposing blade rings are maintained optimally, thus, the turbine efficiencies improve.

According to the gas turbine of the next invention, the partitions are provided in the gaps between the outer surfaces of the communication pipes and the thermal shields, it is possible to reduce the disturbance generated by the contact of the cooling air with the blade ring cooling passages in which the temperature-controlled air flows. Thereby, the heat loss at the blade ring cooling passages becomes substantially controllable, which is impossible by the thermal shields alone. If the temperature control of the steam is performed properly, without the disturbance of the cooling air, the clearance between the moving blades and the opposing blade rings are maintained optimally, thus, the turbine efficiencies improve.

According to the gas turbine of the next invention, it is possible to stagnate the air existing in the gaps between the outer surfaces of the blade rings and the thermal shields, because the sporadic convex-structured partitions are provided in circumferential directions in the gaps between the outer surfaces of the blade rings or communication pipes and the thermal shields. Thereby, the disturbance caused by the contact of the stationary blade cooling air with the blade ring cooling passages in which the temperature-controlled steam flows, can be reduced. Thus, the heat loss at the blade ring cooling passages becomes substantially controllable, which is impossible by the thermal shields alone. If the temperature control of the steam is performed properly, without the disturbance of the cooling air, the clearance between the moving blades and the opposing blade rings are maintained optimally, thus, the turbine efficiencies improve.

According to the gas turbine of the next invention, it is possible to stagnate the air existing in the gaps between the outer surfaces of the blade rings or communication pipes and the thermal shields, because the continuous convex-structured partitions are provided in circumferential directions in the gaps between the outer surfaces of the blade rings or communication pipes and the thermal shields. Thereby, the influences of the blade ring cooling air against the blade ring cooling passages in which the temperature-controlled steam flows can be reduced. Thus, the heat loss at the blade ring cooling passages becomes substantially controllable, which is impossible by the thermal shields alone. If the temperature control of the steam is performed properly, without the disturbance of the stationary blade cooling air, the clearance between the moving blades and the opposing blade rings are maintained optimally, thus, the turbine efficiencies improve.

According to the gas turbine of the next invention, it is possible to stagnate the air existing in the gaps between the outer surfaces of the blade rings or communication pipes and the thermal shields, because the convex-structured partitions, which are arranged are in different directions and in a plurality, are provided in the gaps between the outer surfaces of the blade rings or communication pipes and the thermal shields. Thereby, it is possible to reduce the influences of the stationary blade cooling air against the blade ring cooling passages in which the temperature-controlled steam flows. Thus, the heat loss at the blade ring cooling passages becomes substantially controllable, which is impossible by the thermal shields alone. If the temperature control of the steam is performed properly, without the disturbance of the cooling air, the clearance between the moving blades and the opposing blade rings are maintained optimally, thus, the turbine efficiencies improve.

According to the gas turbine of the next invention, it is possible to stagnate the air existing in the gaps between the outer surfaces of the blade rings or communication pipes and the thermal shields, because the sticking out convex-structured partitions are provided as attachment legs on the face of the thermal shields which face the blade rings. If the air stagnates, it becomes possible to reduce the disturbance caused by the contact of the cooling air with the blade ring passages in which temperature-controlled steam flows. Thus, the heat loss at the blade ring cooling passages becomes substantially controllable, which is impossible by the thermal shields alone. If the temperature control of the steam is performed properly, without the disturbance of the cooling air, the clearance between the moving blades and the opposing blade rings are maintained optimally, thus, the turbine efficiencies improve.

INDUSTRIAL APPLICABILITY

The gas turbine according to the present invention is suitable in improving efficiencies of the blade rings, having cooling passages, and the thermal shields, which are provided around the blade rings.

What is claimed is:

1. A gas turbine comprising:

a blade ring;

a moving blade which rotates along an inside of the blade ring;

a stationary blade mounted to an inner wall of the blade ring;

a steam passage, provided in the blade ring and surrounding the moving blade, for flowing temperature-controlled steam for cooling the moving blade;

an air passage for taking in cooling air from an outside and cooling the stationary blade;

a thermal shield provided to the blade ring between the steam passage and the air passage so that the steam flowing in the steam passage is thermally shielded from the cooling air flowing in the air passage, wherein the thermal shield is attached to a surface of the blade ring with a gap therebetween in such a manner that the cooling air flows in the gap; and a plurality of partitions formed in the gap and on the surface of the blade ring to stagnate the cooling air.

2. The gas turbine according to claim 1, wherein the blade ring is cylindrical; and the partitions stick outwards from the surface of the blade ring along a radial direction of the blade ring, parallel to an axis of the blade ring, and are arranged sporadically on a circumference of the blade ring such that the cooling air that flows along the circumference of the blade ring is stagnant.

3. The gas turbine according to claim 1, wherein the blade ring is cylindrical; and the partitions stick outwards from the surface of the blade ring along a radial direction of the blade ring, perpendicular to an axis of the blade ring, and are arranged continuously on a circumference of the blade ring such that the cooling air that flows along the axis of the blade ring is stagnant.

4. The gas turbine according to claim 1, wherein the blade ring is cylindrical; and the partitions stick outwards from the surface of the blade ring along a radial direction of the blade ring and are arranged in desired directions with respect to an axis of the blade ring on a circumference of the blade ring such that the cooling air that flows along any directions is stagnant.

5. The gas turbine according to claim 1, wherein the thermal shield is supported by the partitions.

6. A gas turbine comprising:

a plurality of blade rings arranged along an axis of the gas turbine;

a moving blade which rotates along an inside of each of the blade rings;

a stationary blade mounted to an inner wall of each of the blade rings;

a plurality of steam passages, provided in the blade rings and surrounding a corresponding moving blade, for flowing temperature-controlled steam for cooling the corresponding moving blade;

an air passage for taking in cooling air from an outside and cooling the stationary blades;

a communication pipe for connecting two steam passages so that steam from one steam passage flows into another steam passage;

a plurality of thermal shields provided to each of the blade rings and the communication pipe between the steam passage and the air passage so that the steam flowing in the steam passage and the communication pipe is thermally shielded from the cooling air flowing in the air passage, wherein the thermal shield is attached to a surface of each of the blade rings and a surface of the communication pipe with a gap therebetween such that the cooling air flows in the gap; and a plurality of partitions formed in the gap and on a surface of each of the blade rings and the communication pipe to stagnate the cooling air.

7. The gas turbine according to claim 6, wherein the blade rings are cylindrical; and the partitions stick outwards from the surface of each of the blade rings along a radial direction of the blade ring, parallel to an axis of the blade rings, and are arranged sporadically on a circumference of each of the blade rings such that the cooling air that flows along the circumference of each of the blade rings is stagnant.

8. The gas turbine according to claim 6, wherein the blade rings are cylindrical; and the partitions stick outwards from the surface of each of the blade rings along a radial direction of each of the blade rings, perpendicular to an axis of the blade rings, and are arranged continuously on a circumference of each of the blade rings such that the cooling air that flows along the axis of the blade rings is stagnant.

9. The gas turbine according to claim 6, wherein the blade rings are cylindrical; and the partitions stick outwards from the surface of each of the blade rings along a radial direction of each of the blade rings and are arranged in desired directions with respect to an axis of the blade rings on a circumference of each of the blade rings such that the cooling air that flows along any directions is stagnant.

10. The gas turbine according to claim 6, wherein the thermal shields are supported by the partitions.

* * * * *